United States Patent [19] [11] 3,815,435
Eschenbacher et al. [45] June 11, 1974

[54] BALL SCREW MECHANISM WITH IMPROVED BALL GUIDE

[75] Inventors: Rolf Eschenbacher, Nurtingen-Oberensingen; Hans-Gunter Steinbrenner, Wendlingen, both of Germany

[73] Assignee: Warner Electric Brake & Clutch Company, South Beloit, Ill.

[22] Filed: Nov. 24, 1972

[21] Appl. No.: 309,253

[52] U.S. Cl. .................................................. 74/459
[51] Int. Cl. .......................................... F16h 55/22
[58] Field of Search ....................................... 74/459

[56] References Cited
UNITED STATES PATENTS
3,234,810  2/1966  Orner ................................. 74/459
3,669,460  6/1972  Wysong ........................... 74/459 X

*Primary Examiner*—Leonard H. Gerin
*Attorney, Agent, or Firm*—Wolfe, Hubbard, Leydig, Voit & Osann Ltd.

[57] ABSTRACT

A ball screw mechanism includes a shaft with an external helical land and groove, and a nut which has an internal helical land and groove telescoped over the shaft. The nut rides on bearing balls located in a race defined by portions of the grooves of the nut and the shaft and the balls are recirculated continuously through the race as the nut turns relative to the shaft by means of a ball guide located in an opening through the side of the nut. A channel through the guide communicates between the ends of the race and passes over the land on the shaft to guide the balls from one end of the race to the other so the balls recirculate through the race. The balls hold the guide outwardly of the shaft and two projections extending laterally from opposite sides of the guide fit within the groove in the nut to keep the guide from being pushed through the opening while also holding the guide precisely in position so the opposite ends thereof deflect the balls into and out of the channel.

4 Claims, 5 Drawing Figures

PATENTED JUN 11 1974
3,815,435
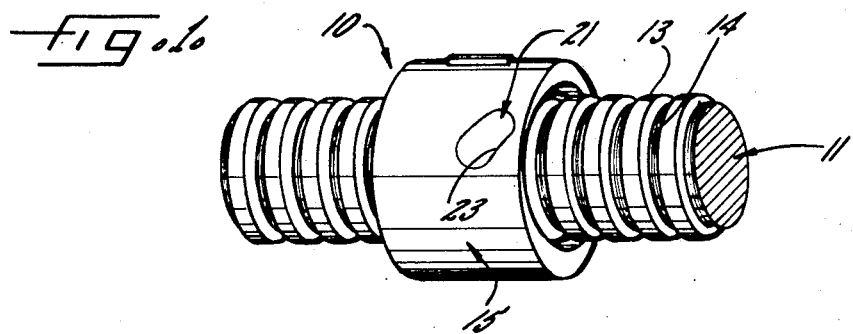
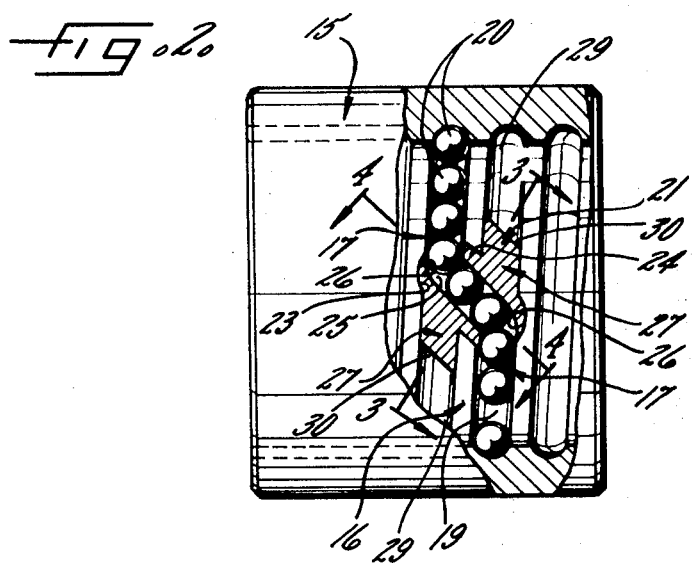
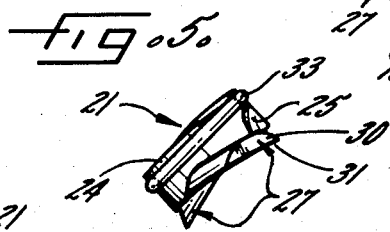
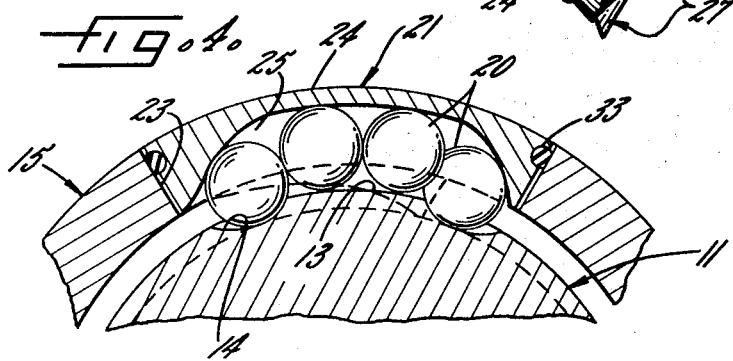

BALL SCREW MECHANISM WITH IMPROVED BALL GUIDE

BACKGROUND OF THE INVENTION

The present invention relates to a ball screw mechanism including a shaft formed with an external helical land and groove and a nut which is formed with an internal helical land and groove telescoped over the shaft and rides upon bearing balls confined within a race defined by the grooves. More particularly, the invention relates to a ball guide used in the mechanism to recirculate the balls through the race as the nut is moved relative to the shaft. The guide fits within an opening in the side of the nut and extends between the adjacent turns of the groove in the nut, and a channel through the guide communicates between the turns so that the balls are guided over the land on the shaft as the nut turns relative thereto. Ball screw mechanisms of the type described thus far are disclosed in Douglas U.S. Pat. No. 2,618,166 and Goad U.S. Pat. No. 3,580,098.

SUMMARY OF THE INVENTION

The general object of the present invention is to provide an improved ball screw mechanism which is easier and less expensive to manufacture and assemble than prior mechanisms of the same general character. A further object is to accomplish the foregoing by constructing the mechanisms in a unique manner whereby the ball guide and bearing balls may be assembled easily and quickly with the nut and screw without need of additional fastening means such as screws or solder or the like.

A more detailed object is to take advantage of the groove of the nut to avoid having to perform a special cutting operation in the walls of the nut from the inside and at the same time use the balls to hold the guide in a precise position for recirculating the bearings through the race.

The invention also resides in the unique shape of the guide and in the use of a projection which extends outwardly from the side of the guide to keep the latter from being pushed out of the opening by the balls while also coacting with the groove to hold the guide in a precise position to recirculate the balls.

These and other objects and advantages of the present invention will become more apparent from the following detailed description when taken in conjunction with the accompanying drawings.

BRIEF DESCRIPTION OF THE DRAWINGS

FIG. 1 is a perspective view of a ball screw mechanism embodying the novel features of the present invention.

FIG. 2 is an elevational view of a part of the mechanism with parts broken away and shown in cross section.

FIG. 3 is a fragmentary cross-sectional view taken substantially along line 3—3 of FIG. 2.

FIG. 4 is a fragmentary cross-sectional view taken substantially along line 4—4 of FIG. 2.

FIG. 5 is a fragmentary perspective view of parts of the mechanism.

DETAILED DESCRIPTION OF THE PREFERRED EMBODIMENT

As shown in the drawings for purposes of illustration, the present invention is embodied in a ball screw mechanism 10 including a shaft 11 with a helical land 13 formed on the exterior surface thereof and defining a helical groove 14 between the turns of the land. A nut 15 telescoped over the shaft includes a land 16 and a groove 17 (see FIG. 2) both of which are formed on the inside surface of the nut, the groove 17 being approximately the same cross-sectional size and shape as the cross-sectional size and shape of the groove 14 and, similarly, the land 16 being about the same cross-sectional size and shape as the land 13.

The two grooves 14 and 17 are aligned with each other so that portions of the grooves define a generally ring-shaped, hardened race 19 (FIG. 2) between the shaft 11 and the nut 15 and a plurality of bearing balls 20 received within the race support the nut on the shaft. The depth of both the grooves is about equal to one half the diameter of one of the balls so that together the grooves define the race as having a diameter approximately equal to the diameter of the balls. Because of a slight clearance between the nut and the shaft, the balls support the nut on the shaft for a relatively friction free transmission of force between the nut and shaft as the nut rotates relative to the shaft.

Herein, slightly less than one helical turn of the groove 17 in the nut 15 defines the length of the race 19 and a ball guide 21 extending between opposite ends of the race serves to recirculate the balls continuously through the race as the nut rotates in order to keep the balls from rolling out from between the nut and shaft 11. As shown in FIGS. 1, 2 and 4, the ball guide fits within an oval opening 23 through the side of the nut and includes a body 24 with a cross-sectional area virtually the same shape as the shape of the opening so the guide can fit within the opening in only one way. The size of the area, however, is slightly smaller than the size of the opening to allow a slight clearance between the body and the side of the opening. A channel 25 extending through the body communicates between the two ends of the race by curving upwardly into the body to pass over the land 13 of the shaft so the balls may ride over the land when moving through the channel between the two ends of the race. As viewed in FIG. 2, the channel is slanted across the land 16 of the nut at an angle of about 45° with respect to the helix angle of the land, and also the channel is generally S-shaped so the sides of the channel adjacent each end thereof provide smooth transition surfaces 26 for deflecting the balls from the race and into the channel. Thus, with the guide of the present arrangement secured within the opening 23, the balls may ride across the surface of the land 13 and recirculate smoothly through the race notwithstanding the direction of rotation of the nut relative to the shaft.

In accordance with the primary aspect of the present invention, a projection 27 conforming generally to the size and to the shape of the groove 17 of the nut 15 extends from the side of the guide 21 and cooperates with the balls 20 in a novel manner to hold the guide within the opening 23. For this purpose, the projection extends generally in a lateral direction away from the side of the guide, beyond the edge of the opening and into the groove 17, and the balls hold the guide outwardly from the shaft 11 seating the projection within the groove. This unique arrangement enables the ball screw mechanism 10 to be assembled without the need of special fastening means such as screws, solder or the like for holding the guide in position to recirculate the balls. Moreover, because of the size and shape of the projection, the present invention takes advantage of the groove both to hold the guide precisely in position and to avoid having to cut a recess in the interior surface of the nut in order for the projection to be kept from engaging the shaft.

In the present instance, two projections 27 extend outwardly from the body, one projection being formed on each side of the body and extending outwardly therefrom at an angle of about 45° with respect to the longitudinal axis of the body 24. Moreover, the projections are offset longitudinally from each other, one projection being located on one side of the body adjacent one end of the channel 25 while the other projection is located on the opposite side of the body adjacent the other end of the channel. On both sides of the body, the projections extend away from the open ends of the channel and into portions 29 of the groove 17 beyond the race 19. In other words, the projections extend into the groove of the nut 15 adjacent each end of the race.

Advantageously, each projection 27 is shaped in conformity with the groove 17 (see FIGS. 2, 3 and 4) as a longitudinally curved, generally cylindrical section having a semicircular cross-sectional area virtually the same size and shape as the cross-sectional area of the groove. In addition, each projection includes an outer end surface 30 which extends generally parallel with the adjacent side of the body. A bottom surface 31 curved concentrically with the central axis of the nut defines the thickness of each projection as being substantially equal to the depth of the groove. Accordingly, when the guide is inserted in the opening 23, the bottom surfaces of the projections remain spaced slightly from the outer surface of the land 13 on the screw shaft 11. Moreover, with the two projections extending laterally beyond the edge of the opening and the balls holding the guide upwardly to seat the projections in the grooves, the guide is held precisely in position to avoid an inaccurate alignment of the channel 25 with the race 19 thereby assuring a smooth flow of the balls 20 through the channel. Thus, with this arrangement the guide is held within the nut without the need of additional fastening means such as screws, solder or the like and, by taking advantage of the groove 17 in the nut, it is unnecessary in the manufacture of the ball screw mechanism 10 to machine the interior surface of the nut to form recesses for receiving the projections.

Assembly of the ball screw mechanism 10 also is simplified as a result of the present invention and is accomplished by inserting the guide 21 in the opening 23 from inside the nut 15. Then, use of a weakly adhesive grease serves to hold the balls 20 in the race 19 and channel 25 to permit a cylindrical arbor (not shown) to be inserted into the nut. The arbor holds the balls and guide in position and is pushed out of the nut as the shaft 11 carefully is telescoped into the nut and rotated to engage the bearing balls to complete the assembly of the mechanism. When the assembly is completed, the guide is held precisely in position by the projections on one hand and by the balls on the other hand.

To protect the interior of the assembled mechanism 10 against the infiltration of dirt through the opening 23 and also to avoid the loss of grease or lubricant through the opening, a sealing member 33 is provided between the side of the opening and the guide 21. Herein, the member comprises an O-ring which is seated within a groove 34 surrounding the body 24 of the guide adjacent the top of the body. When the guide is inserted into the opening, the ring is squeezed between the body and the side of the opening and thus prevents the infiltration of dirt and loss of lubricant.

We claim as our invention:

1. In a ball screw mechanism, the combination of a shaft with an external helical land and groove, a nut with an internal helical land and groove and telescoped over said shaft, a plurality of bearing balls located in a race defined by portions of said grooves, and a ball guide located in an opening through the side of the nut and having a channel communicating between opposite ends of the race and over the land on the shaft to recirculate the balls through the race as the nut turns relative to the shaft, the improvement in said mechanism comprising, a projection extending from one side of the guide, beyond the edge of the opening and into and along the groove in a generally circumferential direction relative to said groove from said opening, said balls holding the guide outwardly of the shaft to seat said projection within said groove in the nut whereby the guide is held in position with the opposite ends thereof precisely located in opposite ends of the race to deflect the balls into and out of the channel.

2. In a ball screw mechanism, the combination of a shaft with an external helical land and groove, a nut with an internal helical land and groove and telescoped over said shaft, a plurality of bearing balls located in a race defined by portions of said grooves, and a ball guide located in an opening through the side of the nut and having a channel communicating between opposite ends of the race and over the land on the shaft to recirculate the balls through the race as the nut turns relative to the shaft, the improvement in said mechanism comprising two projections extending from opposite sides of the guide, beyond the edge of the opening and into and along the groove in opposing generally circumferential directions relative to said groove away from said opening, said balls holding the guide outwardly of the shaft to seat said projections within said groove in the nut whereby the guide is held in position with the opposite ends thereof precisely located in opposite ends of the race to deflect the balls into and out of the channel.

3. A ball screw mechanism as defined by claim 2 wherein each of said projections is curved lengthwise to conform with the curvature of the interior of said nut and each projection has a cross-sectional size and shape conforming to the size and shape of the cross-sectional area of the groove in the nut.

4. A ball screw mechanism as defined by claim 3 with a peripheral groove formed in said guide around the sides thereof and including a sealing member adapted to fit within said groove between the guide and the sides of said opening.

* * * * *